United States Patent
Schmaler et al.

(10) Patent No.: US 10,493,974 B2
(45) Date of Patent: Dec. 3, 2019

(54) METHOD FOR DIAGNOSING FAULT IN A VACUUM SYSTEM INCLUDING A CHECK VALVE

(71) Applicant: Ford Global Technologies, LLC, Dearborn, MI (US)

(72) Inventors: Christian Schmaler, Aachen (DE); Ian Moore, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 15/717,881

(22) Filed: Sep. 27, 2017

(65) Prior Publication Data
US 2018/0086326 A1    Mar. 29, 2018

(30) Foreign Application Priority Data

Sep. 28, 2016 (DE) .................. 10 2016 218 659
Sep. 28, 2016 (DE) .................. 10 2016 218 660

(51) Int. Cl.
| | |
|---|---|
| *B60T 13/52* | (2006.01) |
| *B60T 15/00* | (2006.01) |
| *B60T 17/22* | (2006.01) |
| *F16K 37/00* | (2006.01) |
| *G01M 3/26* | (2006.01) |
| *G01M 3/28* | (2006.01) |

(52) U.S. Cl.
CPC ............ *B60T 17/221* (2013.01); *B60T 15/00* (2013.01); *F16K 37/0041* (2013.01); *G01M 3/26* (2013.01); *G01M 3/2876* (2013.01)

(58) Field of Classification Search
CPC .......... B60T 13/46; B60T 13/52; B60T 15/00; B60T 17/22; B60T 17/221; F16K 37/00; F16K 37/0041; F16K 37/18; G01M 3/26; G01M 3/28; G01M 3/2876
See application file for complete search history.

(56) References Cited

U.S. PATENT DOCUMENTS

| | | | |
|---|---|---|---|
| 5,685,697 A | 11/1997 | Buchanan et al. | |
| 5,941,501 A * | 8/1999 | Biegelsen ............... | B65G 51/03 251/129.01 |
| 7,878,053 B2 * | 2/2011 | Lehner ................... | B60T 17/221 73/121 |

(Continued)

FOREIGN PATENT DOCUMENTS

| | | |
|---|---|---|
| CN | 102069787 A | 5/2011 |
| CN | 103253258 A | 8/2013 |

(Continued)

*Primary Examiner* — Nguyen Q. Ha
(74) *Attorney, Agent, or Firm* — Raymond L. Coppiellie; Burgess Law Office, PLLC

(57) ABSTRACT

A method for fault diagnosis of a vacuum system having a vacuum source and a vacuum consumer connected to the vacuum source via a connecting line with a non-return valve disposed in the connecting line upstream of the vacuum source. The method including indirectly determining a vacuum in the vacuum consumer based on an estimated vacuum value. Providing a flow sensor, using the flow sensor to measure a flow in the connecting line and drawing a conclusion regarding a defect based on the estimated vacuum value and the flow. An exemplary embodiment may also include a combined check valve and flow sensor.

18 Claims, 7 Drawing Sheets

(56) References Cited

U.S. PATENT DOCUMENTS

| | | |
|---|---|---|
| 8,567,239 B2 | 10/2013 | Cunningham et al. |
| 8,899,033 B2 | 12/2014 | Wang et al. |
| 8,989,992 B2 | 3/2015 | Lippok |
| 2003/0006891 A1 | 1/2003 | Wild et al. |
| 2011/0041921 A1* | 2/2011 | Antonsen .................. F16K 1/12 137/1 |
| 2014/0137544 A1 | 5/2014 | Pursifull et al. |
| 2014/0188359 A1 | 7/2014 | Chen et al. |
| 2015/0166034 A1 | 6/2015 | Schumann |

FOREIGN PATENT DOCUMENTS

| | | |
|---|---|---|
| EP | 1417988 A1 | 5/2004 |
| FR | 2898656 A1 | 9/2007 |

\* cited by examiner

METHOD FOR DIAGNOSING FAULT IN A VACUUM SYSTEM INCLUDING A CHECK VALVE

CROSS-REFERENCE TO RELATED APPLICATIONS

Not Applicable.

BACKGROUND OF THE INVENTION

1. Field of the Invention

The invention relates to a method for diagnosing fault in a vacuum system; and more specifically to a method including a check valve having.

2. Description of Related Art

Motor vehicles often use a brake booster to support driver brake pedal actuation by boosting the force applied by the driver. Such vacuum brake boosters produce a force by a pressure difference. A working piston coupled to the master brake cylinder is disposed in a chamber, there is a vacuum on both sides of the working piston when the brake is not being actuated. If the brake is actuated, ambient airflows into the side facing towards the brake pedal, increasing the pressure on that side, up to ambient pressure. Because the other or opposite side has a vacuum, a resultant force acts on the master brake cylinder.

In motor vehicles with combustion engines, the vacuum is usually implemented either by a connection to the intake manifold of the engine or by means of a mechanically operated vacuum pump coupled to the camshaft of the engine. With some motor vehicles, especially with electric vehicles or hybrid vehicles, an electrically operated vacuum pump is provided, which is associated with the brake boosters and which produces the vacuum necessary for the operation thereof.

As the presence of a sufficient vacuum in the brake booster is decisive for an adequate braking force, any damage or defect that could adversely affect the operation of the brake booster must be detected in a timely manner. This especially applies to the detection of a leak. Often such a leak can only be detected by a pressure sensor installed within the system, for example in the brake booster itself. Using such a sensor increases the costs of the entire system. The complexity of the entire system increases, especially if there are multiple versions of a range of vehicles in which such fault diagnosis is required. Here, two versions of the brake booster must be developed and produced, creating additional costs.

There are various known methods in the prior art for measuring the flow of a fluid, i.e. of a gas or a liquid, through a line or the like. In this context, flow can be the volume flow (volume per time unit) or as the mass flow (mass per time unit). Measuring devices used for this purpose are sometimes referred to as flow sensors or flow meters. Besides mechanical solutions, such as an oval gear meter or the turbine wheel meter, there are various other measuring methods, for example, optical, electromagnetic, ultrasound-based, that detect the flow rate of a fluid. Most of the available methods provide high-quality results but are normally very expensive to implement. Creating a relevant restriction in industries wherein costs play a major role.

It is known to integrate a flow sensor and a check valve. A check valve that prevents a fluid from flowing in one direction and allows flow in the other direction, can be used in many sectors. If measurement of the flow is desired, integration of a corresponding sensor into the check valve may save space. However, a structurally simple and inexpensive solution is desirable.

Simplification of fault diagnosis with a vacuum system, for example with a system for brake force boosting, especially regarding the detection of leaks, still leaves room for improvements.

SUMMARY OF THE INVENTION

A method for fault diagnosis of a vacuum system having a vacuum source and a vacuum consumer connected to the vacuum source via a connecting line with a non-return valve disposed in the connecting line upstream of the vacuum source. The method including indirectly determining a vacuum in the vacuum consumer based on an estimated vacuum value. Providing a flow sensor, using the flow sensor to measure a flow in the connecting line and drawing a conclusion regarding a defect based on the estimated vacuum value and the flow.

A further exemplary embodiment may also include a combined check valve and flow sensor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. It should be noted that the features and measures that are mentioned individually in the following description can be combined with each other in any technically meaningful manner and indicate further embodiments of the invention. The description additionally characterizes and specifies the invention especially in connection with the figures.

Figure 1:
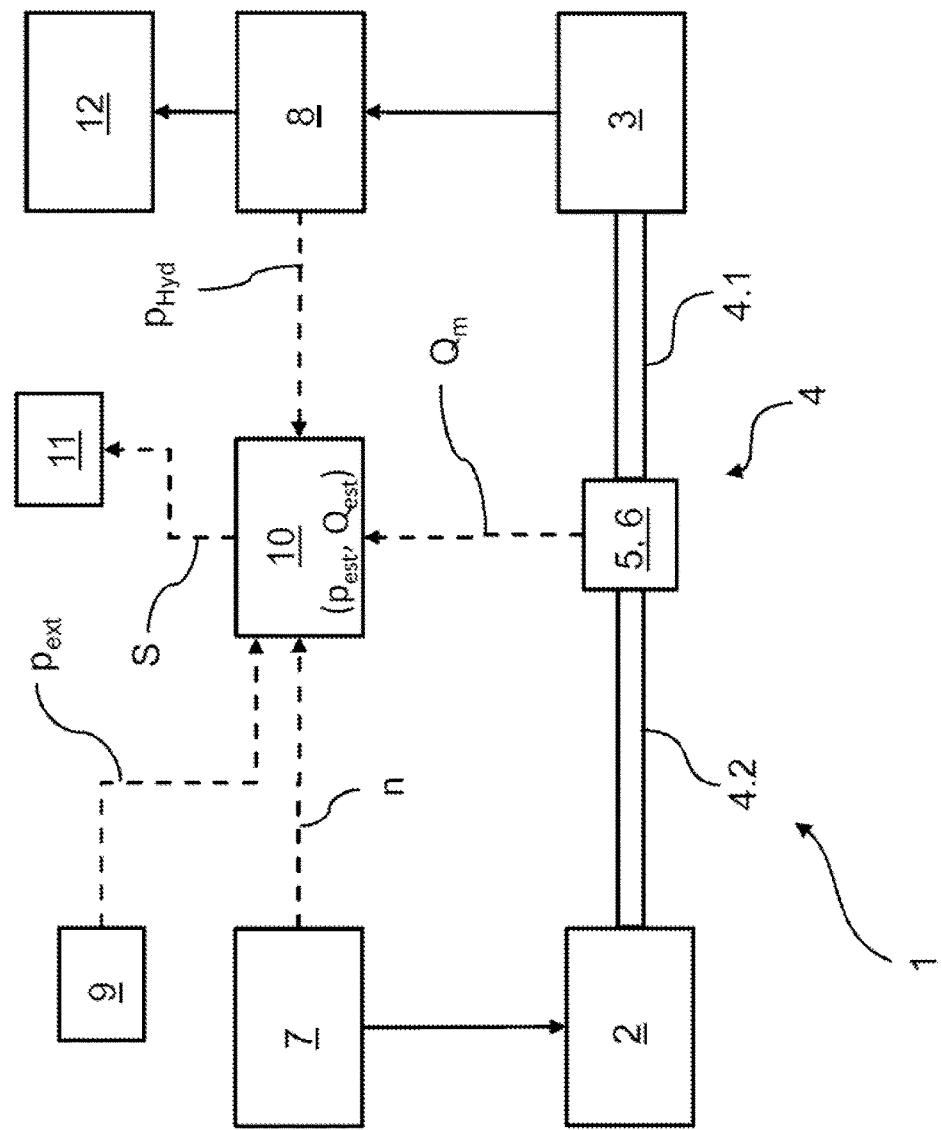
FIG. 1 is a schematic diagram of a system for brake force boosting according to an exemplary embodiment of the present invention.

FIG. 1 is a schematic diagram illustrating the relationship of various component of a system of a motor vehicle, seen generally at 1, for brake force boosting. A brake booster 3, operating in a known manner of vacuum brake force boosting, acts on a brake module 8 that provides a hydraulic brake pressure, from the brake module 8 to a brake system 12. The brake booster 3 is connected via a connecting line 4 to vacuum source, shown as a vacuum pump 2. The vacuum pump 2 mechanically coupled to an engine 7 of the motor vehicle, whereby the pump power is directly related to a revolution rate n of the engine 7. An electrically operated vacuum pump could also be used. Here, the pump power would not be related to the revolution rate n, but for example to an electrical power take-up.

In intended operation air flows only from the brake booster 3 to the vacuum pump 2, therefore the brake booster 3 is disposed upstream of the vacuum pump 2. The interposed connecting line 4 can be divided into a first or upstream section 4.1 and a second or downstream section 4.2. A non-return valve 5 is disposed in the connecting line 4 between the two sections 4.1, 4.2. As set forth below, the non-return valve 5 may include a, or operate as a, flow sensor 6 at the same time. The flow sensor 6 producing a measurement value $Q_m$ corresponding to the flow, more accurately to the volumetric flow, in the connecting line 4. The measurement value $Q_m$ forwarded to a diagnostic unit 10. The diagnostic unit 10 is used for fault diagnose, that is it diagnosis a fault within the represented system 1. Specifically, the diagnostic unit 10 detects a fault and also classifies the fault. The diagnostic unit 10 can be partly implemented in software, which however shall not exclude it from consisting of a plurality of possibly spatially separated components. It can also at least in parts be integrated within a larger unit (for example an on-board computer) that also carries out other functions.

Besides the measurement value $Q_m$ for the flow, the diagnostic unit 10 receives the revolution rate n of the engine 7, an ambient pressure $p_{ext}$ from an ambient pressure data source 9 (for example a pressure sensor) and a value for the hydraulic pressure $p_{Hyd}$ from the electronic brake module 7. With an electrically operated vacuum pump, the diagnostic unit 10 would receive measurement values that represent the electric power take-up of the vacuum pump.

If the diagnostic unit 10 detects a defect, it sends a defect signal S to a display device 11 to make a user aware of the defect visually and/or audibly. In addition, the defect signal S can also be sent to a memory device that can be read during maintenance or repair of the motor vehicle. The defect signal S can, for example, be used with heavy braking to generate a deficit of braking force boosting by the brake booster 3 by an additional hydraulic braking force build-up using an ABS pump not represented here. Possible defects within the system 1 that can be detected by the diagnostic unit 10 include the presence of a leak, a malfunction of the vacuum pump 2 and sticking of the non-return valve 5.

Figure 2:
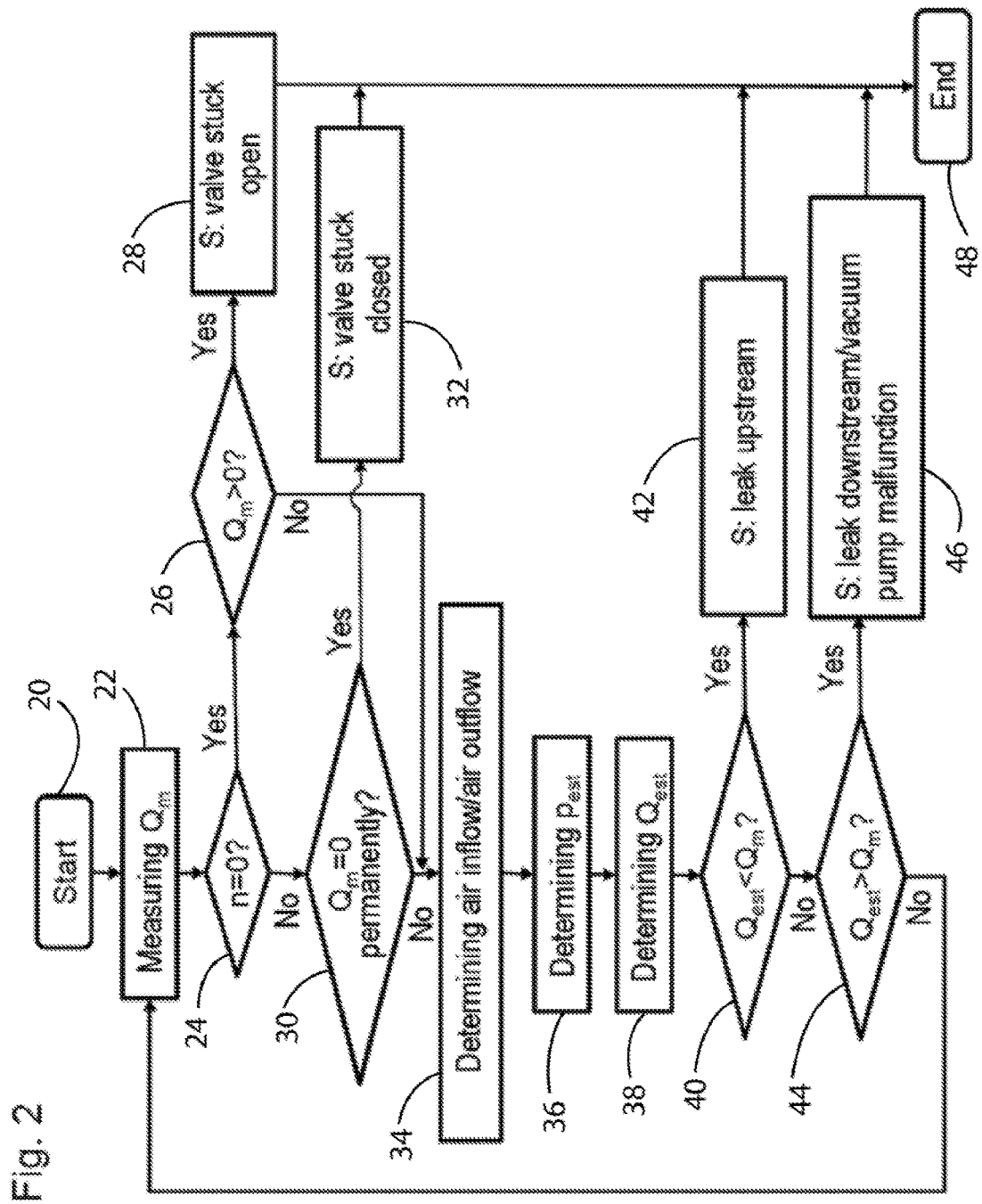
FIG. 2 is a flow chart of a method according to the invention for fault diagnosis according to an exemplary embodiment of the present invention.

Further function of the diagnostic unit 10 is described using the flow chart in FIG. 2. The method starts at step 20 after which, in step 22, the flow $Q_m$ is measured. Step 24 carries out a check as to whether the non-return valve 5 is stuck, in one embodiment by checking whether the engine revolution rate n equals 0, which corresponds to deactivation of the vacuum pump 2. With a properly functioning non-return valve 5 there should be no flow to be measured. However, if in step 26 it is detected that the corresponding measurement value $Q_m$ is greater than 0, or greater than a threshold value, which for example takes into account a limited measurement accuracy, a defect signal S, see step 28, is produced that indicates that the non-return valve 5 is stuck in the open position. The process then ends at step 48.

If the engine revolution rate n is not equal to 0, this means that the vacuum pump 2 is in operation. The method then proceeds to step 30 wherein, for proper operation of the non-return valve 5 it is to be determined whether there is a flow, at least temporarily. For example, if the vacuum in the brake booster 3 is produced again following a braking process and it is detected that the measured flow is continuously equal to 0 or is negligibly small, this is an indication that the non-return valve 5 is locked in the closed position. The method proceeds to step 32 wherein a corresponding defect signal S is produced and the process is ended at step 48. It is also conceivable that sticking of the non-return valve 5 has cleared and the method is not ended but returned to the start, step 20.

If the system does not detect sticking of the non-return valve 5 in either the open or closed state, the method moves to step 34 wherein the air inflow to the brake booster 3 and the air outflow from the same are determined. Regarding the air outflow, which corresponds to a gain of vacuum, the revolution rate n at which the engine 7 is currently operating can be checked. This corresponds to a pump power of the vacuum pump 2. This gives the air outflow, possibly with additional consideration of the currently estimated value $p_{est}$ for the vacuum in the brake booster 3, that passes exclusively to the vacuum pump 2 for a properly operating system 1. Regarding the air inflow, which corresponds to a loss of vacuum, for example the hydraulic pressure $p_{Hyd}$ can be checked, which provides information about the activation of the brake system 12. Furthermore, the ambient pressure $p_{ext}$ can be incorporated in the determination. Air outflow and air inflow, or gain of vacuum and loss of vacuum, can either be calculated, or they are determined with look-up tables, which for example can be stored in the diagnostic unit 10. Using the values obtained in this way, the new value for the vacuum $p_{est}$ is determined in a next step by addition or subtraction. This is an estimated vacuum value, which can deviate from the actual pressure in the brake booster 3.

After determining air inflow/air outflow, the method moves to step 36 and determines estimated vacuum value $p_{est}$. Step 38 determines expected flow $Q_{est}$ using the estimated vacuum value $p_{est}$, again possibly taking into account the activation of the vacuum pump 2, or the current engine revolution rate n. In step 40 a check is made on whether the expected flow $Q_{est}$ is less than the measured flow $Q_m$. Normally, a simple inequality is not checked for during this, as represented in the flow chart, but whether the expected flow $Q_{est}$ is less than the measured flow $Q_m$ by a certain threshold value. This enables systematic inaccuracies to be taken into account without any small difference already being interpreted as a defect within the system 1. If the check is positive, then this is interpreted to the effect that there is a leak upstream of the non-return valve 5, i.e. either in the first line section 4.1 or within the brake booster 3 and the method moves to step 42 wherein a defect signal S is produced that indicates an upstream leak. The process then ends at step 48.

If the check is negative, the method moves to step 44 wherein a check is carried out on whether the expected flow $Q_{est}$ is greater than the measured flow $Q_m$. Again, the check is whether the expected flow $Q_{est}$ exceeds the measured flow $Q_m$ by a certain threshold value. If the check is positive, this is interpreted to the effect that either there is a leak downstream of the non-return valve 5, i.e. either in the second line section 4.2 or possibly within the vacuum pump 2, or even a malfunction of the vacuum pump 2 is indicated and the method moves to step 46 wherein a defect signal S is produced that indicates the downstream leak or the malfunction. The process then ends at step 48.

If during the check neither sticking of the non-return valve 5, nor a leak nor a malfunction of the vacuum pump 2 is detected, the method returns to step 22, measurement of the flow $Q_m$, and runs through the steps again.

In the flow chart of FIG. 2, measurement of the flow $Q_m$ is carried out at the start of the loop shown. Alternatively, the corresponding measurement can be carried out at any point within the loop, if for example a single measurement is carried out before entering the loop to which reference can be made.

As set forth above, the method provides for fault diagnosis of a vacuum system. As illustrated, it can be a system within a motor vehicle, for example a passenger vehicle or commercial vehicle. In particular, it can be a system for brake force boosting. The vacuum system includes a vacuum source and a vacuum consumer, connected to the vacuum source via a connecting line with the interposition of a non-return valve and which is disposed upstream of the vacuum source. The term "vacuum consumer" refers here to a unit that uses a vacuum or partial vacuum for the operation thereof that it does not produce itself. Normally, during operation the vacuum is reduced by ambient air flowing in. The vacuum consumer can be an actuator operated by a vacuum, for example a force booster. The vacuum consumer can be a brake booster.

The vacuum source is generally used to produce or re-establish a vacuum and can, for example, be an electrically operated vacuum pump, connected to a battery of a motor vehicle. It can also be a mechanical vacuum pump connected to the camshaft of a combustion engine. The vacuum source can be formed by the intake manifold of the combustion engine. The term "vacuum" is to be understood in the sense of "partial vacuum", and a "vacuum source" or a "vacuum generator" could also be referred to instead. The vacuum source is connected to the vacuum consumer via the connecting line, which is used to produce or re-establish a vacuum in the vacuum consumer if the vacuum has reduced following a braking process, for example. Regarding the length, shape and other design details of the connecting line, there are no limitations within the scope of the invention. The line can also be made of multiple parts. The non-return valve 5 provided controls the air flow within the connecting line and is disposed within the connecting line. The non-return valve should block cases in which a stronger vacuum occurs in the vacuum consumer than in the vacuum source. This is usually also provided for a case of pressure equality. If the vacuum in the vacuum source is greater than in the vacuum consumer, the non-return valve should open. The envisaged direction of the air flow is from the vacuum consumer to the vacuum source. In this sense, the vacuum consumer is disposed upstream of the vacuum source, and the vacuum source is downstream of the vacuum consumer.

The method can be carried out by a diagnostic unit, which can be implemented partly by software, and which in hardware terms can be part of a larger unit, for example a control unit and/or an on-board computer of a vehicle, which also carries out other tasks.

With the method according to the invention, a vacuum in the vacuum consumer is indirectly determined as an estimated vacuum value. Here a vacuum is referred to in the narrower sense as the positive pressure difference between an ambient pressure in the surroundings of the vacuum consumer and the pressure occurring within the vacuum consumer. If for example the absolute ambient pressure is 1 bar and the absolute pressure in the vacuum consumer is 0.1 bar, then a vacuum of 0.9 bar exits. In a wider sense however, the term "vacuum" can also refer to an absolute pressure that is lower than the ambient pressure. Here, the indirect determination of the vacuum means that the vacuum is not measured directly with a sensor, but that the vacuum is concluded based on other measurement values or operating parameters, for example of the motor vehicle. Determining the vacuum carried out in this way can be in error to a certain extent, so the determined vacuum can deviate from the actually occurring vacuum, for which reason an estimated vacuum value is referred to here.

A flow in the connecting line is measured at least qualitatively by a flow sensor 6. The measurement can be carried out here by the diagnostic unit interrogating the flow sensor. Here, the term "flow" usually means "volumetric flow", i.e. the volume of a fluid, in this case air, that flows through a cross-section of the connecting line 4 per unit time. Sometimes however, for example the mass flow could also be determined. The flow sensor 6 can be entirely or partially disposed within the connecting line 4. Regarding the design itself the flow sensor 6 measures the flow at least qualitatively, meaning it determines whether a flow is indicated or whether no flow is indicated. It is also conceivable that the flow sensor 6 detects whether the flow lies above or below a defined threshold value. It is also possible that the flow sensor 6 only provides measurement values that indicate that the flow lies within a defined range of values. Preferably, the flow can be quantitatively measured with the flow sensor 6, i.e. the measurement value of the sensor can be directly interpreted as the flow, for example the volumetric flow, of a defined magnitude. The flow sensor 6 is in the exemplary embodiment disposed in the region of the non-return valve 5.

After the estimated vacuum value and the flow have been determined, a conclusion regarding a defect is drawn, for example by the diagnostic unit. Depending on determined values, it will be decided whether there is a defect or not. This also includes, as explained, the possibility that the type of defect that exists, or the type of defects that can exist, can be differentiated. In operation, a defined vacuum in the vacuum consumer corresponds to a defined flow, wherein an activation state of the vacuum source may also have to be taken into account. If there is a deviation, for example the estimated vacuum, or an estimated flow derived therefrom, and the measured flow do not match each other, there is a defect. Here, the method according to the invention functions without a pressure sensor for determining the pressure in the vacuum consumer, for example in the brake booster, as the vacuum is not directly measured, but is determined indirectly. For indirect determination there are various possibilities, some are mentioned. A dedicated pressure sensor provided in the vacuum consumer can be dispensed with, whereby the problems associated therewith in terms of costs, weight etc. are not applicable.

If the detection of a fault occurs, a visual and/or audible indication is produced that advises the user of the defect. Information about the defect can also be placed in a memory, which can be read out for example in the event of an inspection or a repair.

The estimated vacuum value is preferably determined based on the balance of the air inflow and the air outflow. This means that the air inflow to the vacuum consumer, or the loss of vacuum, and the air outflow from the vacuum consumer, or the gain of vacuum, are directly or indirectly determined. Beginning with a starting value that can be determined without direct measurement, for example 0 bar vacuum, or an absolute pressure that corresponds to the ambient pressure, during commissioning of the vehicle, the current pressure is determined by addition and subtraction of the corresponding values. During this, complicated calculations do not necessarily have to be carried out in real time, instead tables of values can be accessed that are based on calculations or calibration measurements.

According to an exemplary embodiment, the air inflow is determined based on the activation of a brake. This concerns a case in which the vacuum consumer is a brake booster. More generally, the activation of a device to which the vacuum consumer is coupled for force transmission can be discussed. The activation of the brake can for example be detected by the measurement of the position of a brake pedal, of the hydraulic pressure in a master brake cylinder, or other parameters. In addition, measurement of the ambient pressure may also be incorporated. Because of the activation of the brake, the vacuum in the brake booster is reduced or air flows into the brake booster. The loss of vacuum in the brake booster because of the actuation of the brake, especially of a master brake cylinder, can be determined from the hydraulic brake pressure, and possibly from the ambient pressure in the surroundings of the brake booster. This is possible because a defined hydraulic pressure corresponds to a defined working travel of a piston in the brake booster, which gives the amount of air, at ambient pressure, that flows into the brake booster. As the hydraulic pressure in the master brake cylinder can be detected by a hydraulic pressure sensor, typically present in modern vehicles, implementation of the present embodiment in such a vehicle may only require detection of the ambient pressure. As the ambient pressure is available in many vehicles as a value for other purposes, there is no additional hardware cost. Additionally, the measurement of the hydraulic brake pressure, the actuation travel of the brake pedal, the distance by which the brake pedal is depressed, can be used, which usually also corresponds to a defined working travel of the piston in the brake booster. The relationship between the air inflow and the activation of the brake can for example be determined experimentally by calibration, and presented as tables that can be accessed.

According to a further exemplary embodiment, the air outflow is determined based on the activation of the vacuum source. The air outflow, by which the vacuum in the vacuum consumer is produced, depends upon whether and to what extent the vacuum source is active. With an electric vacuum pump, for example the pump power can be ascertained from the motor current. With a vacuum pump mechanically coupled to the camshaft of the engine, the pump power can be ascertained from the engine revolution rate. The same applies to the case in which the intake manifold of the engine of the vehicle forms the vacuum source. It will be understood that the air outflow also depends on the pressure difference between the vacuum source and the vacuum consumer, so that the estimated vacuum value can be incorporated in the calculation here using feedback. Other parameters, for example the length and cross-section of the connecting line and the design of the non-return valve, have an influence on the air outflow. Such influences can be determined experimentally by calibration, so a table of values can be accessed.

One method with which the vacuum in a brake booster can be estimated exclusively using the hydraulic pressure in the master brake cylinder and the current engine revolution rate is known for example from U.S. Pat. No. 8,989,992.

An expected flow is advantageously determined based on the estimated vacuum value. I.e. it is determined, for example by calculation or using a look-up table, what the flow would be with the estimated vacuum if all parts of the system were undamaged and working correctly, i.e. in the ideal state. Besides the estimated vacuum value, optional further parameters can be incorporated in the determination, such as for example the operating state or the effectiveness of the vacuum source. The expected flow is generally quantitatively determined, for example as a specific value in cubic centimeters per second. It is however also conceivable that the flow is only qualitatively determined (flow negligible/not negligible) or is estimated (flow greater/smaller than a threshold value). Different defects in the system can be diagnosed based on the expected flow.

According to one embodiment of the invention, a leak upstream of the non-return valve is concluded if the measured flow is greater than the expected flow. This especially also includes the case in which the expected flow is negligible or is zero, whereas the measured flow is not negligible. The term "negligible" denotes here and below a value that either coincides with zero within the context of the measurement accuracy or is less than a defined (smaller) threshold value, which for example takes into account a deviation from zero, which is hardly avoidable for structural reasons. For example, such a threshold value in relation to the flow could be selected so it takes into account slight leaks within the system that cannot be prevented without disproportionate cost for structural reasons.

A leak upstream of the non-return valve can occur in the part of the connecting line disposed upstream, i.e. on the side of the vacuum consumer, relative to the non-return valve, or in the vacuum consumer itself. Such a leak causes external air to flow constantly into the upstream region, whereby the vacuum there decreases or the generation or maintenance of a vacuum is disrupted. This especially results in the two sides of the non-return valve being unable to form a pressure balance, so the non-return valve, if it is operating correctly, will not close for a long period or will not fully close. In any case, the estimated vacuum value is too high, the absolute pressure in the vacuum consumer is underestimated, causing the expected flow to be lower than the measured flow. Depending on the measurement accuracy and the accuracy of the underlying model, in the event of such a leak the measured flow and the expected flow also temporarily coincide. In particular however, eventually the measured flow deviates in the described manner, from which the leak can be detected.

According to a further embodiment, a leak downstream of the non-return valve or a malfunction of the vacuum source can be concluded if the measured flow is lower than the expected flow. Here, there is usually a leak within the connecting line downstream relative to the non-return valve, i.e. on the side of the vacuum source, producing a pressure balance between the two sides of the non-return valve, however the quality of the vacuum in the downstream connecting line is degraded because external air can flow in through the leak. If the vacuum source has a malfunction, this can also cause the quality of the vacuum in the downstream connecting line to be degraded. The poorer quality of the vacuum causes the pressure difference on both sides of the non-return valve to be reduced immediately after a braking process if the vacuum in the vacuum consumer has reached the lowest level thereof. The result of this is that the non-return valve opens less than expected, or if a large leak occurs even remains closed, whereby the measured or actual flow is less than the expected flow. In the event of such a leak, a full pressure balance is reached at least after a certain time and the non-return valve closes (if it is working properly), which also corresponds to the long-term expected state in a defect-free system. However, a deviation between the expected flow and the measured flow will result at least a temporarily low vacuum in the vacuum consumer, whereby the downstream leak can be detected.

When checking whether the measured flow is less than or greater than the expected flow, it is generally not advantageous to check whether there is a difference, but whether the difference is greater than a defined threshold value. Such a threshold value can take into account measurement inaccuracies, inaccuracies in the estimation of the vacuum, and the resulting expected flow. The size of the threshold value that must be selected can be determined experimentally using a properly functioning system.

With the exemplary embodiments, it is assumed that the non-return valve is operating properly. Whether this is the case may also be checked without particular structural costs, especially without an additional sensor, as discussed below.

According to an optional further embodiment of the method, depending on the measured flow and an activation state of the vacuum source, sticking of the non-return valve can be concluded. The measured flow is analyzed, which also includes the possibility of a purely qualitative analysis, for flow or no flow and whether the vacuum source is activated is incorporated, whether the vacuum in the source has been re-established. With an electric vacuum pump, it is checked whether the pump motor is operating; with a vacuum pump coupled to the camshaft of the engine, the operating state of the engine is checked; the latter also applies to the case in which the intake manifold of the engine constitutes the vacuum source.

On the one hand, it is possible that sticking of the non-return valve in the open state can be concluded if the measured flow is not negligible with the vacuum source deactivated. This especially applies to a period of time immediately after the deactivation of the vacuum source. As the vacuum source was activated shortly before, if proper operation of the system occurs it can be assumed there is a relatively high vacuum in the vacuum consumer. If the vacuum now decreases on the vacuum source side because the source is activated, the non-return valve would now have to block and with proper operation no flow may be detected. However, If the non-return valve is stuck in the open position, air flows in the opposite direction from the vacuum source to the vacuum consumer. If the measurement of the flow is based on the detection of the open state of the non-return valve, an open valve immediately before the first activation of the vacuum source after a long time, for example at the start of a journey, also indicates sticking. In this state, either both the vacuum source and the vacuum consumer, for example the brake booster, should have no vacuum or the latter would have to still have a vacuum resulting from the last operation. In both cases, the valve would have to be closed for proper operation.

It is possible that sticking of the non-return valve in the closed state is concluded if the measured flow is permanently negligible with the vacuum source activated. The term "permanently" means that no or only a negligible flow is measured over a long period, within which for example at least one braking process has taken place and thereby re-establishing the vacuum in the brake boosters was necessary. With proper operation of the non-return valve and an activated vacuum source, in this case the non-return valve would be open at least intermittently and thereby a significant flow would be detectable. If this is not the case, that is the non-return valve is permanently closed, this indicates sticking in the closed state. In principle, similar behavior could also arise if a very large leak occurs downstream of the non-return valve. Sometimes, a large leak prevents a vacuum on the downstream side of the non-return valve and only after a smaller leak has occurred can it be detected in the manner described above. A sudden occurrence of a large leak is however possible, for example if a connecting hose loosens or similar. For safety reasons, in this case a fault message can be output that mentions both alternatives.

It is advantageous if the flow sensor is combined with or integrated within the non-return valve. Perhaps the non-return valve forms the flow sensor. This especially includes designs in which the opening state of the non-return valve is checked directly or indirectly. Here, the flow value can be measured by determining an opening state of the non-return valve. Such a combination of the flow sensor within the non-return valve is space saving and can sometimes also be implemented in a cost-saving manner.

The flow value can advantageously be determined by measurement of at least one electrical variable, for example an electrical resistance of the non-return valve. For this purpose, different embodiments of the non-return valve are conceivable.

In one exemplary embodiment, the non-return valve comprises a base body with a plurality of through openings and an electrically conductive membrane comprising an inner section attached to the base body with a first electrical contact and a movable outer section enclosing the contact, wherein the base body comprises at least one electrode disposed in the region of the through openings connected to a second electrical contact, and wherein in a closed position the membrane covers the through openings and the outer section is disposed adjacent to at least one electrode.

In another exemplary embodiment, the non-return valve comprises a base body with at least one through opening, an electrically conductive membrane that comprises a first section attached to the base body with a first electrical contact and a second movable section in succession along an X-direction, wherein the base body comprises at least one electrode extending in the X-direction connected to a second electrical contact, and, wherein in a closed position of the membrane the at least one through opening is covered and the second section is disposed adjacent to the at least one electrode.

Figure 3:
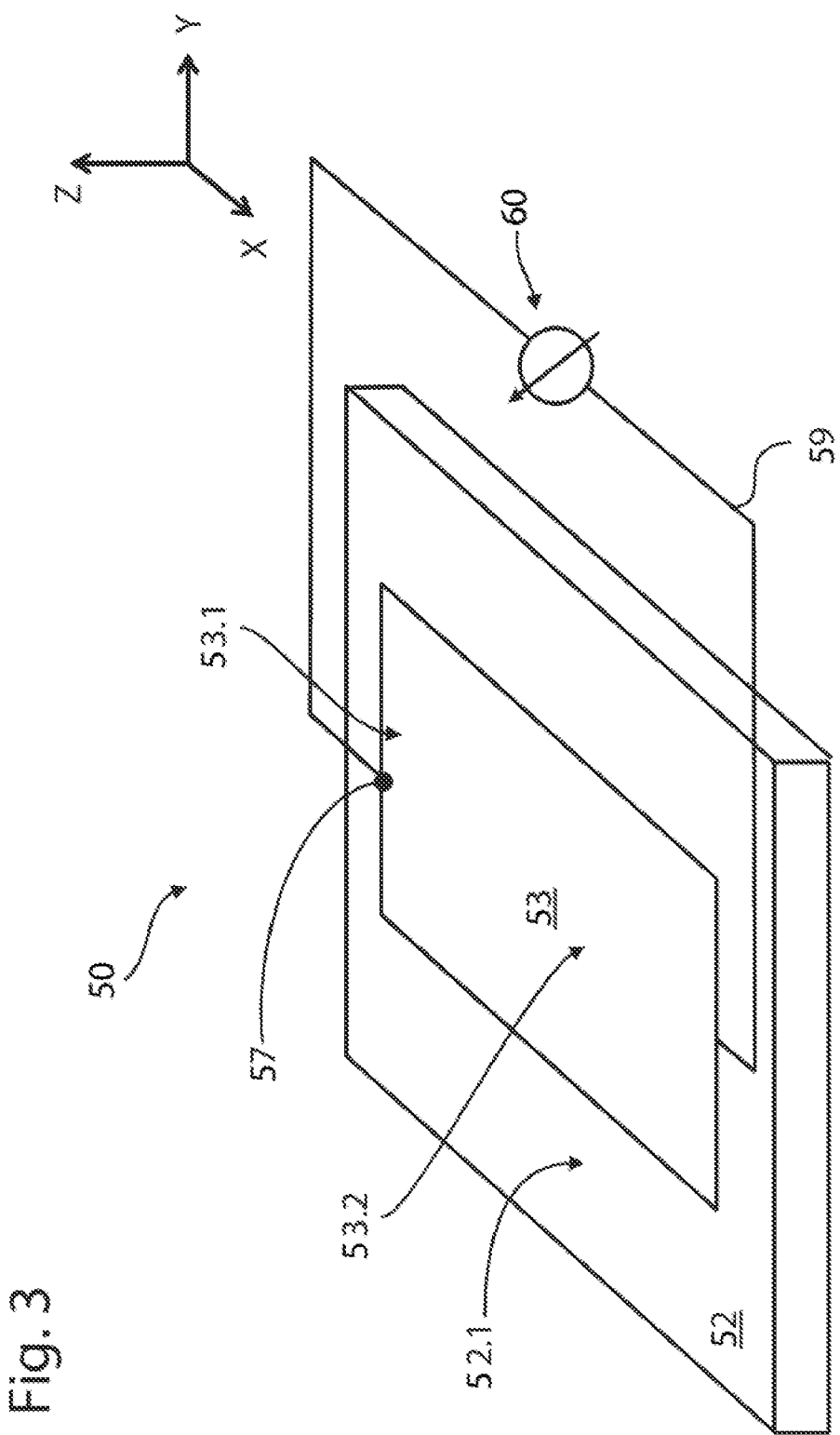
FIG. 3 is a schematic view of a first embodiment of a check valve in a closed position according to an exemplary embodiment thereof.

FIG. 3 shows an exemplary embodiment of a combined or integrated nonreturn or check valve and flow sensor as set forth above, hereafter referred to as valve 50. The valve 50 has a main body 52, on which an electrically conductive diaphragm 53 is secured. As shown, a first section 53.1 of the diaphragm is secured on the main body 52 by adhesive bonding, for example, while a second section 53.2, larger in area in the example under consideration, can be moved relative to the main body 52. During this process, the second section 53.2 can be bent and raised from a surface 52.1 of the main body. The two sections 53.1, 53.2 are arranged in succession when viewed in an X direction. The first section 53.1 has a first electrical contact 57, which is connected to a circuit 59.

The main body 52 is shown with a rectangular cross section, this should be regarded as purely schematic. It can also have a round cross section and can be provided with threaded elements or holes for screws, for example, by for securing it within a fluid line.

Figure 4:
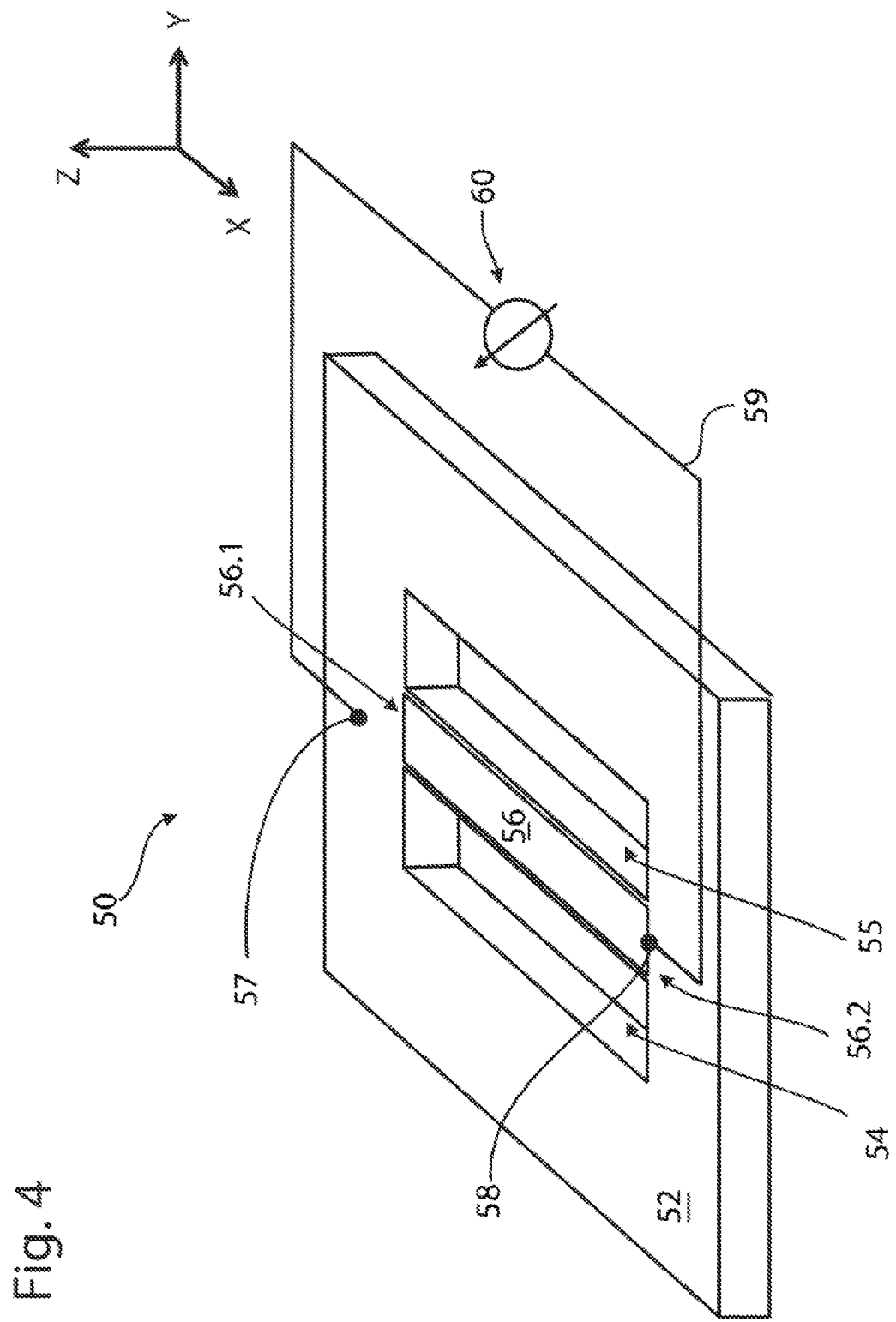
FIG. 4 is a schematic view of a portion of the check valve of FIG. 3.

The rest of the structure of the valve 50 is explained with reference to the partial view in FIG. 4, in which the diaphragm 53 has been omitted. The main body 52 has two through openings 54, 55, each with a rectangular cross section elongate in an X direction, meaning the extent thereof in the X direction is approximately five times the extent in a Y direction or transverse thereto. The two through openings 54, 55 allow a fluid, e.g. air, through the main body 52. The direction of flow of the fluid corresponds to a Z direction or perpendicular to the X direction and to the Y direction. When or if the fluid has a higher pressure on the side of the diaphragm 53, the through openings 54, 55 are closed by the diaphragm 53 and the valve 50 is in a closed position as illustrated in FIG. 3.

A web, on which a resistance element 56 is arranged, extends between the through openings 54, 55. The resistance element 56 has the form of a rectangular, relatively thin film, for example a metal oxide film, that is applied to the surface of the web. Here, the resistivity of the resistance element 56 can be higher by at least a factor of 10 than the resistivity of the diaphragm 53, for example. The resistance element 56 extends over the entire length of the through openings 54, 55 in the X direction. As shown, an end 56.2 of the resistance element 56 remote from the first section 53.1 extends by the same amount in the X direction as the through openings 54, 55. An end 56.1 adjacent to the first section 53.1 extends as far as the first section 53.1. The resistance element 56 fills almost the entire width of the web and is adjacent to both through openings 54, 55. Arranged at the end 56.2 is a second electrical contact 58, which is likewise connected to the circuit 59.

The circuit 59 is closed between the first electrical contact 57 and the second electrical contact 58 by the conductive diaphragm 53 and the resistance element 56 on which the diaphragm 53 rests. Since the resistivity of the resistance element 56 is greater than that of the diaphragm 53, the resistance element 56 is bridged by the diaphragm 53 in the closed position as illustrated in FIG. 3. The total resistance between the two electrical contacts 57, 58 is determined primarily by the resistance of the diaphragm 53. The resistance can be determined with a measuring device 60, which comprises a voltage source, for example, and measures the current in the circuit 59.

Figure 5:
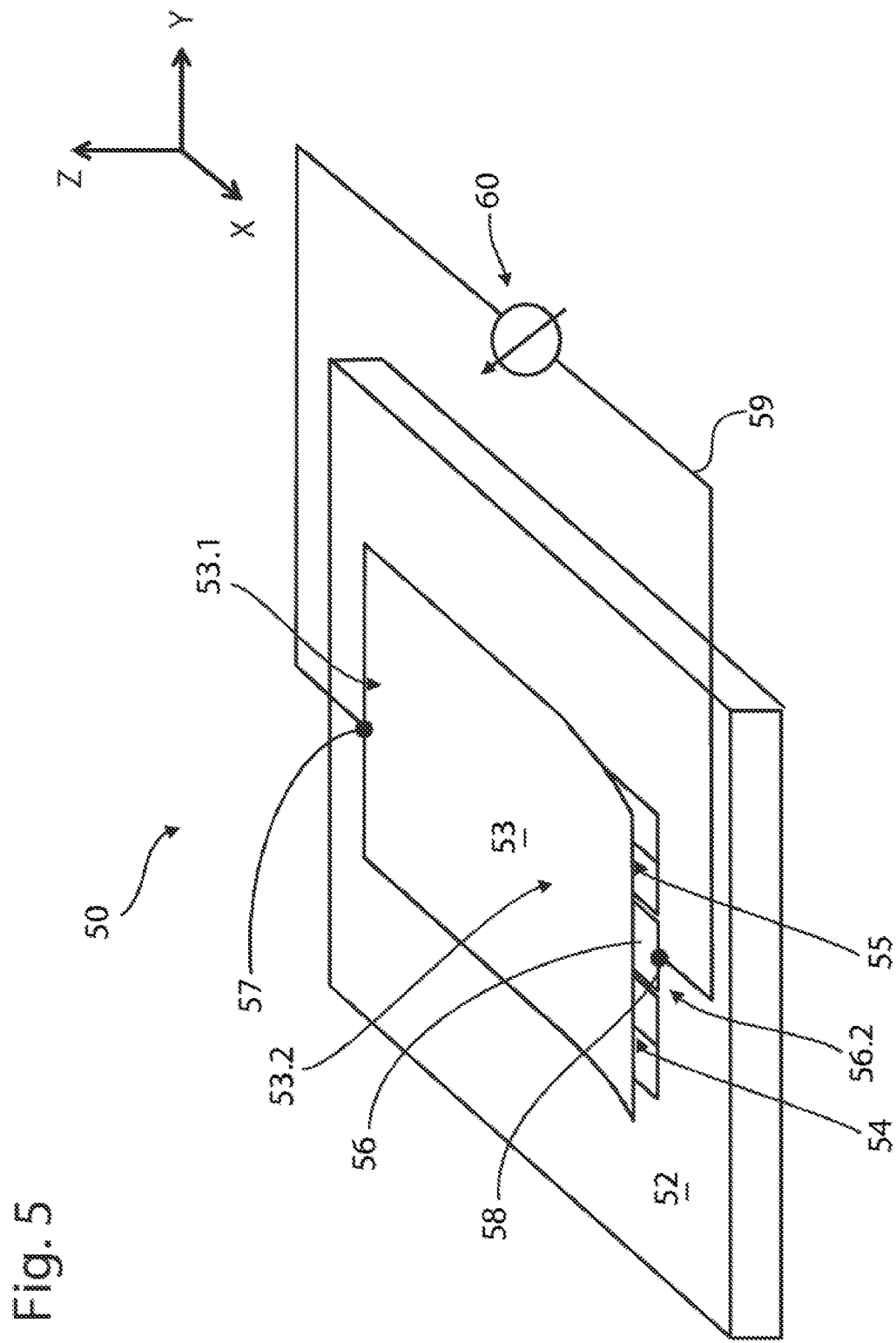
FIG. 5 is a schematic view of the check valve of FIG. 3 in a first, open position.

The diaphragm 53 is composed of an elastic material, wherein the second section 53.2 is preloaded against the main body 52 in the closed position illustrated in FIG. 3. However, it can be deflected elastically out of the closed position by a fluid pressure acting from the side of the through openings 54, 55, causing it to rise completely or partially from the surface 52.1 of the main body 52 and of the resistance element 56. Such a state is illustrated in FIG. 5, which shows the check valve 50 in a first open position. Here, the second section 53.2 has been slightly bent elastically, so that it is shown raised from the surface 52.1. Part of the through openings 54, 55 are exposed, and the fluid can flow through. A generally nonlinear relationship between the exposed area and the flow can be determined, for example, experimentally. Because the second section 53.2 rises from the surface 52.1, there is also partial separation from the resistance element 66. This has the effect that the part of the resistance element 56 which is no longer in contact with the diaphragm 53 is no longer bridged and contributes a considerable extent to the total resistance. A corresponding increase in resistance can be recorded by the measuring device 60.

Figure 6:
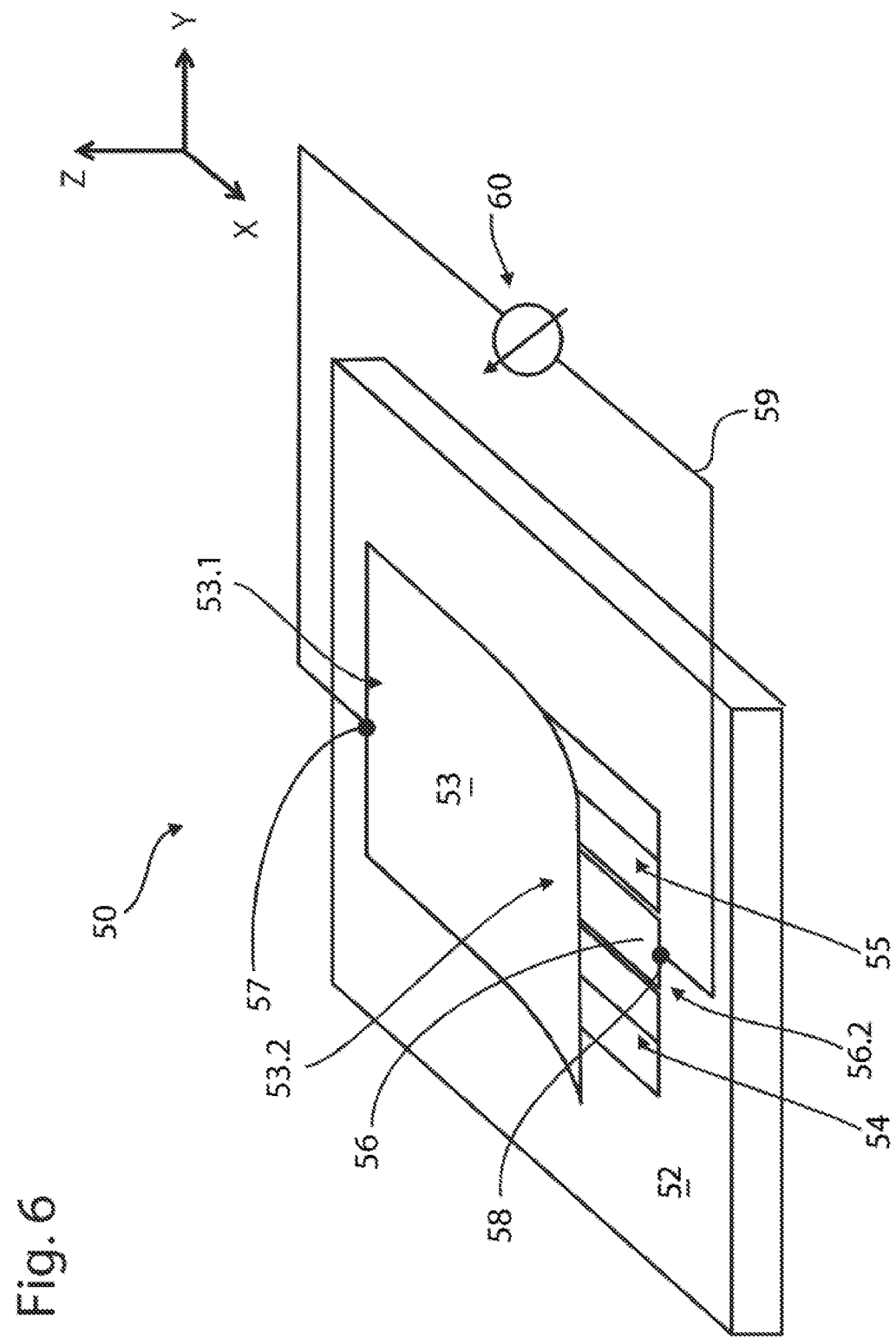
FIG. 6 is a schematic view of the check valve of FIG. 3 in a second, open position.
Figure 7:
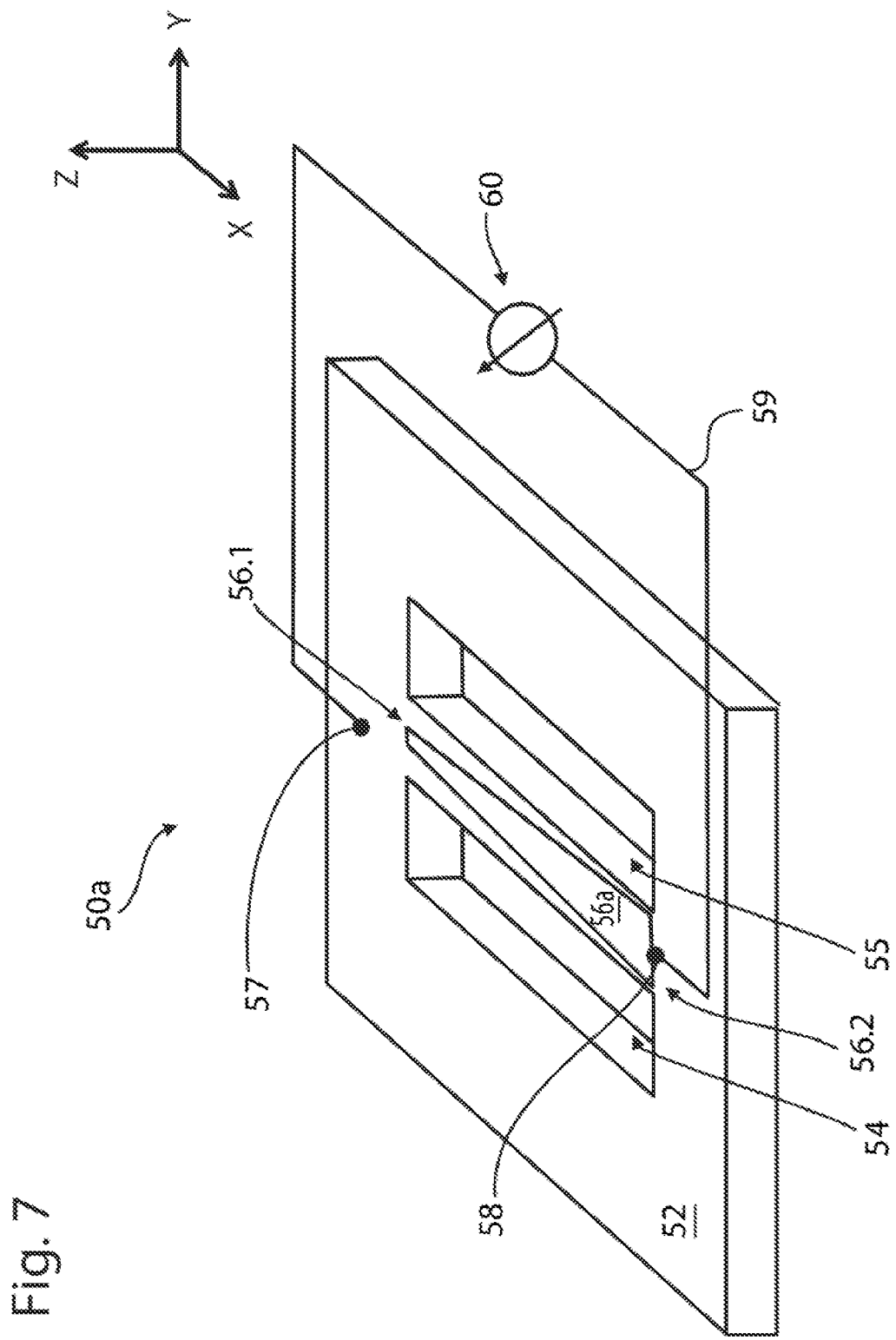
FIG. 7 is a schematic view of part of a second embodiment of a check valve according to an exemplary embodiment thereof.

FIG. 6 shows in open position of the valve 50 according to exemplary embodiment, in which the flow is increased as compared with FIG. 5. As shown there is a further separation of the second section 53.2 from the surface 52.1 and the resistance element 56. A larger proportion of the through openings 54, 55 is exposed and the diaphragm 53 rests on an even smaller part of the resistance element 56. Because this even smaller part is bridged in the sense described above, it leads to a further increase in the total resistance.

Where the resistivity of the resistance element 56 is significantly greater than that of the diaphragm 53, the total resistance with the valve 50 in FIGS. 3-6 is approximately proportional to the exposed area of the through openings 54, 55. FIG. 7 shows another exemplary embodiment of a valve 51a, where this is not the case. Again, the diaphragm 53 has been omitted, as in FIG. 2. The valve 51a largely corresponds to that shown in FIGS. 1-4 and, to this extent, is not described once again. However, the resistance element 56a here has an extent in the Y direction that varies along the X direction. The resistance element 56a has a substantially trapezoidal and furthermore triangular shape, wherein it tapers toward the first section 53.1. Since the resistance of the tapered parts is greater, owing to the smaller cross section, the total resistance overall changes in a nonlinear manner with the exposed area of the through openings 54, 55.

The exemplary embodiment provides a valve 50 that allows passage of a fluid, i.e. a gas or a liquid, in one direction and prevents it in the opposite direction, depending on a pressure difference on the two sides of the valve, and is a check valve. Valve 50 controls the flow of a gas, e.g. air. The valve 50 has a main body 52 having at least one through opening 54, 55. The main body 52 can also be termed a valve body and corresponds to the stationary part of a check valve, installed on or in a fluid line, for example. For this purpose, it can have connecting means, such as threads or holes to receive screws. In operating state, the one through opening 54, 55 allows the passage of the fluid through the valve 50. Regarding the geometry of the at least one through opening 54, 55, there are no restrictions in the context of the invention. For example, the through opening can be elongate or short in the envisaged direction of passage of the fluid.

The valve 50 further includes an electrically conductive diaphragm 53, which, in succession in an X direction, has a first section 53.1 secured on the main body 52 and having a first electrical contact, and has a second, movable section. Here, the term "diaphragm" implies this is a flexible body of sheet-like design, at least in some section or sections. In this context, the term "X direction" is used only as a reference and implies no orientation in relation to the installation position within a fluid line, to the direction of passage of the fluid or the like. In this X direction, it is therefore possible to distinguish between two sections 53.1, 53.2, of which the first is secured on the main body, while the second is movable relative to the main body and correspondingly, the first section. The mobility is associated with a deformation of the flexible diaphragm. Here, the second section can be raised from the main body, move perpendicularly to the surface thereof. The first section can be secured on the main body materially, for example, by adhesive bonding or ultrasonic welding, but optionally also non-positively and/or positively, e.g. by clamping.

The diaphragm 53 is electrically conductive, including the possibility it is composed entirely of an electrically conductive material, e.g. a polymer matrix, into which electrically conductive particles are incorporated or it is only partially electrically conductive, or has a conductive coating. Here, a first electrical contact is arranged on the first section, allowing connection to a current or voltage source, for example. The electrical contact can be of very simple design, for example, a metal pin to which a cable can be soldered or as a plug connector. It is also possible for an electric lead connected in a fixed manner to the valve to be connected directly to the electrical contact. Such a lead can also be designed as a conductor track on a circuit board forming at least part of the main body. Further conductor tracks can be applied to a circuit board, and layered arrangement of a plurality of conductor tracks insulated from one another is also possible. It is self-evident that the first electrical contact is connected in a conducting manner to the diaphragm or to the electrically conductive part thereof.

The main body has at least one electrode extending in the X direction, which is connected to a second electrical contact. The at least one electrode extends in the X direction, which means that it has an extent not negligible in the X direction. It is also possible for a plurality of electrodes to be provided in succession in the X direction. It is likewise possible for a plurality of electrodes spaced apart transversely to the X direction to be provided. At least one electrode can be of flat design and formed at or below the surface of the main body. Here, the electrode or each electrode is connected to the second electrical contact, including the possibility that the second electrical contact is formed directly on an electrode. Besides the connection to the second electrical contact, the at least one electrode can be electrically insulated with respect to the outside, for example a dielectric or at least partially electrically contactable. The at least one electrode is intrinsically electrically conductive and allows charges to be moved or currents to flow at least within the electrode. The foregoing design of the first contact also applies to the second contact. The second electrical contact is connected electrically to the at least one electrode and allows connection to a current or voltage source. It can be arranged on the main body.

In a closed position, the diaphragm covers the at least one through opening, and the second section is arranged adjacent to the at least one electrode. This is the closed position of the valve, in which the valve prevents fluid from passing through counter to the direction envisaged. The diaphragm acts as a closing element, covering the at least one through opening. The diaphragm closes the through opening completely or closes it by covering it completely. To be able to act as a movable closing element, the diaphragm covers the through opening at least partially with the second, movable section. The through opening is preferably covered predominantly and, ideally, completely by the second section. The second section is arranged adjacent to the at least one electrode in the closed position, including the possibility that the second section contacts the at least one electrode. The proximity of the electrically conductive diaphragm to the at least one electrode makes it possible to detect the closed position by measuring at least one electrical variable. For example, the at least one electrode can be insulated by a dielectric, wherein the electrically conductive diaphragm acts as a counter electrode. Depending on the position of the second section relative to the at least one electrode, the capacitance of the arrangement changes, wherein the closed position can be associated with a particular, often characteristic, capacitance. Here, therefore, the first and second electrical contacts would be connected to the terminals of a voltage source, leading to capacitance-dependent charging of the arrangement.

In an open position, the second section is raised at least partially from the main body, meaning, the at least one through opening is at least partially exposed but, that the second section moves away from at least one electrode. This always leads to a change in the electrical properties, to a change in the capacitance, wherein there is a correlation between a changing electrical measured variable and the exposed area of the through opening. With the valve according to the disclosed exemplary embodiment, it is possible to determine the state of opening of the valve or the flow through the latter by measuring an electrical variable. Depending on the geometrical and material configuration of the elements, the correlation between the measured variable and the flow can be complex, in particular nonlinear, but it can be determined by calibration in tests, for example.

The exemplary embodiment provides a valve that simultaneously functions as a flow sensor. Here, the valve can be of relatively simple and low-cost design. A very space-saving design is also possible. The second section of the diaphragm also is normally the only moving part of the valve, and therefore there is virtually no wear, and blocking of the valve is virtually impossible. Normally, the only movement is the raising of the second section from the main body, there is no friction due to parts moving relative to one another.

During the transition from the closed position to the open position, it is preferably the part of the second section furthest away from the first section that separates first from the main body, wherein additional parts of the second section separate successively as the pressure difference increases and, during this process, progressively expose the at least one through opening. This has the effect that the second section moves progressively away from the at least one electrode, this being associated with a successive change in the measured variable.

At least one resistance element extending in the X direction is preferably arranged as an electrode on the main body, wherein the second section rests on the resistance element in the closed position. The term "resistance element" implies an electrical resistance but should not be interpreted as restrictive regarding the total resistance or the resistivity. The resistance or resistivity of the resistance element may be lower in certain circumstances than that of the electrically conductive diaphragm. The resistance element can be designed in the form of a film as a carbon, metal or metal oxide film resistor. Here, the second section rests on the resistance element in the closed position. An electrical connection is established, which is why the diaphragm must be electrically conductive, at least on the side facing the resistance element. In the closed position, therefore, there is overall an electrical connection from the first electrical contact, via the electrically conductive diaphragm and the resistance element to the second electrical contact. An electric current can flow and, from the relationship between the voltage and current, it is possible to determine a total resistance characteristic of the closed position.

In the open position, the second section is raised at least partially from the main body, meaning the at least one through opening is at least partially exposed but, also that the second section rests only partially or not on the resistance element. The total resistance that can be measured between the first and second electrical contacts changes, wherein there is a correlation between the measured resistance and the exposed area of the through opening. It is possible to determine the state of opening of the valve or the flow through the latter by resistance measurement. The correlation between the resistance and the flow can be complex, in particular nonlinear, but it can be determined by calibration in tests, for example.

During the transition from the closed position to the open position, it is preferably the part of the second section furthest away from the first section that separates initially from the main body, wherein additional parts of the second section separate successively as the pressure difference increases and, during this process, progressively expose the at least one through opening. This has the effect that the second section separates progressively from the resistance element, this being associated with a successive change in the total resistance. In this respect, the check valve acts in a manner similar to a potentiometer, wherein the diaphragm or the second section thereof acts as an adjusting element.

The resistance element is preferably arranged adjacent to a through opening in a Y direction extending transversely to the X direction. In the above-described process of successive separation from the main body, which takes place along the X direction, the exposure of parts of the through opening takes place in parallel with the separation from the resistance element. The increase in the flow rate and the change in the total resistance likewise take place in parallel, making it easier to determine a correlation.

Arranging the resistance element adjacent to a through opening is preferred. Either the resistance element directly adjoins the through opening or there is a gap, although this is smaller than an extent of the resistance element or of the through opening in the corresponding direction, at most 20% or 30%, for example. A closer correlation between the separation from the resistance element and the exposure of the through opening and the diaphragm can be optimized regarding its area since it must cover at least the through opening and must touch the resistance element. In this context, it is advantageous if the gap between the through opening and the resistance element is not large.

An end of the resistance element remote from the first section extends at least as far in the X direction as the at least one through opening. The end of the resistance element furthest away from the first section in the X direction is at least as far away as the end of each through opening that is furthest away. Wherein, even when only the remotest end of the through opening is exposed by lifting of the second section of the diaphragm, this leads in all cases to separation of the second section from part of the resistance element. In turn entailing a change in the total resistance, and therefore even a minimal exposure of part of a through opening is electrically detectable.

An end of the resistance element adjacent to the first section of the diaphragm extends at least as far as the first section in the X direction. The resistance element extends at least as far as the end of the second section in this direction. This has the effect that slight changes in position of the second section are still electrically detectable, even when the second section is virtually separated from the main body.

In principle, the valve may have one through opening and one resistance element. In a preferred embodiment, the main body has at least two through openings, between which the resistance element is arranged. In one embodiment, the resistance element is arranged between the two through openings in the Y direction. In an arrangement of this kind, the flow against the diaphragm can be symmetrical, for example, and this generally also leads to symmetrical or uniform rising from the through openings. In this arrangement, the two through openings and the resistance element can extend adjacent to one another in the X direction in the manner of strips.

When there is just one through opening, it may be advantageous to provide two resistance elements, between which the through opening is arranged. When there is one resistance element, it could otherwise happen, if the diaphragm rose slightly and asymmetrically for example, this could not be detected because it happened on the opposite side of the diaphragm from the resistance element.

In principle, it is sufficient for operating the valve that the diaphragm is flexible, wherein it may be possible for it move into the closed position simply by the flowing fluid or the pressure difference. Two allow reliable closure of the through opening, however, the second section can be deflected elastically out of the closed position. Owing to a pressure difference due to a fluid, the second section can be deflected in such a way it exposes the through opening, although this deflection is elastic, meeting that a restoring force arises, by which the second section is returned to the closed position as soon as there is no longer an external pressure difference or external force acting. The closed position can correspond to a relaxed position of the second section, or the second section can be preloaded against the main body in the closed position. To achieve elastic deflectability, it is possible for the diaphragm itself to be of elastic design. As an alternative, an additional return element acting on the diaphragm could also be provided.

The second electrical contact can be arranged at an opposite end of the resistance element from the first electrical contact, wherein the second electrical contact is arranged at the outermost end of the resistance element. The spatial distance between the two electrical contacts is maximized. Normally, those parts of the resistance element that are further away from the first electrical contact than the second electrical contact carry no current, or do so only to a slight extent, and have hardly any effect on the total resistance. The exemplary embodiment corresponds to optimum usage of the resistance element.

The valve acts as a potentiometer, the resistance of which is used to measure the flow. Regarding sensitivity, a change in the flow as small as possible leads to a change in the resistance which is as large as possible. This can be influenced by the choice of resistivity for the resistance element and the conductive diaphragm. It is also possible for the geometry of the at least one through opening to play a part, for example at least one through opening has a larger extent in the X direction than in the Y direction. The corresponding extent can be at least twice or at least five times as great, for example. It would also be possible to state that the cross section of the through opening is elongate in the X direction and narrow in the Y direction. If the second section separates asymmetrically, separates more on one side of the through opening than on the other side, a measurement error associated with this is therefore smaller. It is also often the case that asymmetrical separation of this kind occurs less often or is less pronounced with a plurality of through openings.

Regarding possible asymmetrical separation of the second section, at least one resistance element may have a larger extent in the X direction than in the Y direction. Here too, the corresponding extent can be at least twice or at least five times as great, for example.

As already mentioned above, there are no particular restrictions regarding the resistivity of the diaphragm and of the resistance element. However, the diaphragm may have a resistivity lower than the resistance element. In particular, the resistivity can be significantly lower, e.g. ten times or one hundred times lower. In this embodiment, the total resistance is determined predominantly by the proportion of the resistance element on which the second section of the diaphragm is not resting. The remaining parts of the resistance element are bridged by the diaphragm.

The way in which the total resistance changes during the separation of the second section can be influenced by the geometry of the resistance element. In the case of a cuboidal resistance element for example, the resistivity of which is greater than that of the diaphragm, a substantially linear relationship would be the result. According to an alternative embodiment, at least one resistance element has an extent in the Y direction and/or in the Z direction which varies along the X direction. If the extent in the X direction is regarded as the length of the resistance element, the width thereof, in the Y direction, and/or the thickness thereof, in the Z direction, can therefore vary. The corresponding extent can vary in a linear manner, or in a nonlinear manner as a function of the X coordinate.

The valve according to the invention can be integrated into many systems in which the actual valve function is supposed to be combined in a space-saving and low-cost way with measurement of the flow. In a system for brake boosting, for example, the valve can be inserted in a connecting line between a brake booster and a vacuum source, a mechanically or electrically operated vacuum pump or the intake manifold of the engine. This makes it possible to determine the flow in a simple manner and opens various possibilities, for example detection of leaks in the system, without performing direct pressure measurement within the brake booster. The expected pressure in the brake booster can be determined or estimated indirectly. From the expected pressure in the brake booster and the pressure in the vacuum source, it is possible to derive an expected flow. If this expected flow does not coincide with the measured flow, it is possible from this to infer a leak. This is advantageous in comparison with prior art systems, which are reliant for such a fault diagnosis on direct pressure measurement in the brake booster, which is complex and expensive owing to the need to integrate a pressure sensor there. The valve 50 as set forth above is inexpensive and can be integrated easily.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for fault diagnosis of a vacuum system that includes a vacuum source and a vacuum consumer connected to the vacuum source via a connecting line, with a valve disposed upstream of the vacuum source comprising:
   indirectly determining a vacuum in the vacuum consumer based on an estimated vacuum value;
   providing a flow sensor and using said flow sensor to measure a flow in the connecting line; and
   drawing a conclusion regarding a defect in the system based on the estimated vacuum value and the flow.

2. The method of claim 1 wherein the estimated vacuum value is determined based on balancing an air inflow to the vacuum chamber and an air outflow from the vacuum chamber.

3. The method of claim 2 wherein the air inflow is determined based on a brake activation and the air outflow is determined based on a vacuum source activation.

4. The method of claim 1 wherein said conclusion includes a leak upstream of the valve if the measured flow is greater than an expected flow based on the estimated vacuum value.

5. The method of claim 1 wherein said conclusion includes a leak downstream of the valve if the measured flow is lower than the expected flow based on the estimated vacuum value.

6. The method of claim 1 wherein said conclusion includes a malfunction of the vacuum source if the measured flow is lower than the expected flow based on the estimated vacuum value.

7. The method of claim 1 wherein said conclusion includes sticking of the valve depending on the measured flow and an activation state of the vacuum source.

8. The method of claim 7 wherein said conclusion includes the valve is stuck in an open state if the measured flow is not negligible and the vacuum source is deactivated.

9. The method of claim 7 wherein said conclusion includes the valve is stuck in a closed state if the measured flow is negligible and the vacuum source is in an activated state.

10. The method of claim 1 including a flow sensor combined with the valve, wherein said valve is a check valve.

11. A valve comprising:
    a body;
    an electrically conductive diaphragm having a first section secured on the body, a first electrical contact, and a second section;
    wherein the body includes an electrode connected to a second electrical contact, wherein in a closed position the diaphragm covers the opening and the second section is adjacent the electrode,
    wherein the electrode has a resistance element on the body,
    wherein the second section rests on the resistance element in the closed position, and
    wherein the body has at least two openings and the resistance element extends between the two openings.

12. The valve of claim 11 wherein the resistance element is adjacent to the openings.

13. The valve of claim 11 wherein the opening extends in a longitudinal direction and an end of the resistance element remote from the first section extends at least as far in the longitudinal direction as the openings.

14. The valve of claim 11 wherein the first section extends in a longitudinal direction and an end of the resistance element adjacent to the first section extends at least as far as the first section in the longitudinal direction.

15. The valve of claim 11 wherein the second section deflects elastically from the closed position.

16. The valve of claim 11 wherein the second electrical contact is at an opposite end of the resistance element from the first electrical contact.

17. A method for fault diagnosis of a vacuum system that includes a vacuum source and a vacuum consumer connected to the vacuum source via a connecting line, with a valve disposed upstream of the vacuum source comprising:
    indirectly determining a vacuum in the vacuum consumer based on an estimated vacuum value;
    providing a combined valve and flow sensor and using said combined valve and flow sensor to both impede and measure a flow in the connecting line; and
    drawing a conclusion regarding a defect in the system based on the estimated vacuum value and the flow.

18. The method of claim 17 wherein said combined valve and flow sensor includes:
    a body having an opening;
    an electrically conductive diaphragm having a first section secured on the body, a first electrical contact, and a second section;
    the body includes an electrode connected to a second electrical contact, wherein in a closed position the diaphragm covers the opening and the second section is adjacent the electrode; and the electrode having a resistance element on the body wherein the second section rests on the resistance element in a closed position.

* * * * *